Nov. 4, 1952  R. B. CARTER, JR  2,616,846
SUPERNATANT LIQUOR STRAINERS FOR SLUDGE DIGESTION TANKS
Filed Sept. 28, 1949  2 SHEETS—SHEET 1

INVENTOR.
RALPH B. CARTER, JR
BY

Nov. 4, 1952     R. B. CARTER, JR     2,616,846
SUPERNATANT LIQUOR STRAINERS FOR SLUDGE DIGESTION TANKS
Filed Sept. 28, 1949     2 SHEETS—SHEET 2

INVENTOR.
RALPH B. CARTER, JR.
BY

Patented Nov. 4, 1952

2,616,846

UNITED STATES PATENT OFFICE 2,616,846

SUPERNATANT LIQUOR STRAINERS FOR SLUDGE DIGESTION TANKS

Ralph B. Carter, Jr., Maywood, N. J., assignor to Ralph B. Carter Company, Hackensack, N. J., a corporation of New York Application September 28, 1949, Serial No. 118,207

2 Claims. (Cl. 210—2)

This invention relates to supernatant liquor strainers for sludge digestor plants.

The treatment of sewage sludge by anaerobic bacteria in sludge digestion tanks produces a large amount of relatively clear liquor called supernatant liquor. The digested sludge settles to the bottom of the digestor tank and the supernatant liquor forms in layers or strata at various and unpredictable heights in the digestor. Between the strata of supernatant liquor are stratas of digesting sludge.

It is desirable to withdraw the supernatant liquor only and retain all the sludge in the digestor. In general practice, this liquor withdrawal is manually performed and must be very exactly done so as to withdraw a minimum of sludge. It is very important that no sludge, or as little as possible, be withdrawn from the digestors with the supernatant liquor.

The invention consists of a strainer having peripheral conduit passages, which are automatically variable within certain limits of conduit cross-sections during the operative use of the strainer, and in one embodiment consists of a helical spring with convolutions which may be spaced from each other to provide such supernatant liquid passages of a maximum distance from nearest surface to nearest surface of ⅜ of an inch, the controlling associated members for the spring being such as to prevent an extension in excess of such dimensional passages.

Such strainer is combined with a floating non-fixed cover of a digestor tank, enabling the withdrawal of the supernatant liquid to be continuous or intermittent, depending on operating conditions, and providing also an automatic balance between inflow and outflow, or conversely, in the digestor, the conduit passages becoming smaller as the cover moves downwardly, often at parts squeezing the sludge lodged between them, thereby reducing the available secreening area, and decreasing the flow of the supernatant liquid discharge into the strainer, until the outflow of the supernatant liquid balances the inflow of the new sludge material. When, however, the inflow exceeds the outflow, the movable cover ascends, the conduit passages are increased, thereby increasing said outflow, until a balancing again takes place. Should the strainer become clogged to a point which decreases the outflow through it to a capacity below the then existing inflow, the ascending cover increases the conduit passages, allowing the small particles caught therein to flow through, thus self cleaning the passages, and increasing the screening conduit passages.

Instead of the spring, devices operating in the same way may be used, as cooperating cutout sleeves, and instead of the strainer being controlled by the cover, a servomotor, controlled exterior to the tank, may be used to regulate the strainer conduits.

The invention will be further described, an embodiment shown in the drawings, and the invention will be finally set forth in the claims.

In the accompanying drawings.

Similar character of reference indicate corresponding parts throughout the various views.

Figure 1:
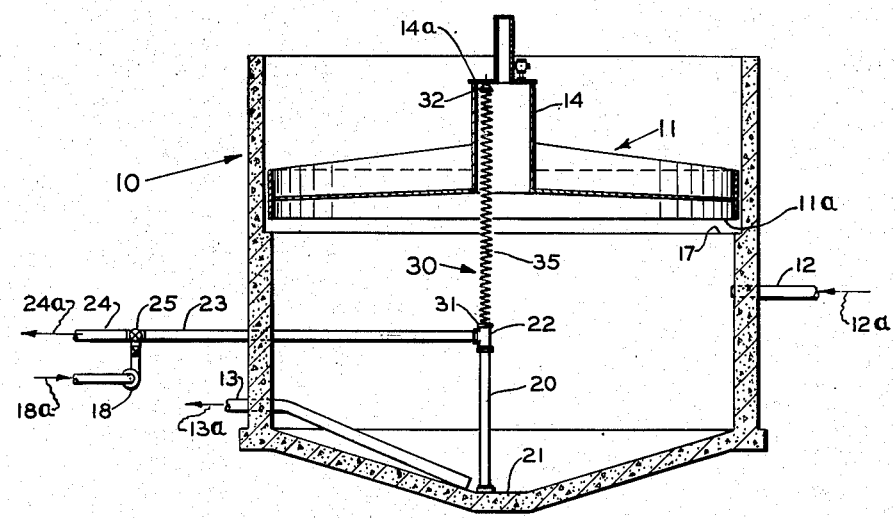
Fig. 1 is a vertical central section of a known digestor apparatus, with an embodiment of this invention applied thereto.

Referring to the drawings, the known digestor 10 has a floating non-fixed or movable cover 11 with a gas dome 14, a raw sludge inflow pipe 12, and a sludge outlet pipe 13, the arrows 12a and 13a indicating the direction of the flow. These parts or the like are known.

A shoulder 17 provided in the tank 10 limits the lowest position of the cover by the flange 11a resting on the shoulder 17.

Preferably, substantially in the central part of the tank 10, an upright support 20 is secured to the bottom 21 of the tank 10, upon which a T or elbow pipe 22 rests, which has a horizontal extension pipe 23, discharging at the outside of the tank, as at 24, the direction of the arrow 24a indicating the flow, which may be connected to any tank, etc., as desired and known. A two way valve 25, is provided which may shut off the discharge end 24, and receive a cleaning fluid forced into the pipe 23 for cleaning purposes, by means of a pump 18, as indicated by the arrow 18a.

The novel strainer 30 has its lower end 31 resting upon the T 22 and has its lower end in communication with its interior, and extends vertically upwards, and has its upper end 32 secured preferably, as in the embodiment, to the top 14a of a gas dome 14. The combination of the tank, its movable cover, and the variable strainer is thus disclosed in Fig. 1.

Figures 2, 3, 4:
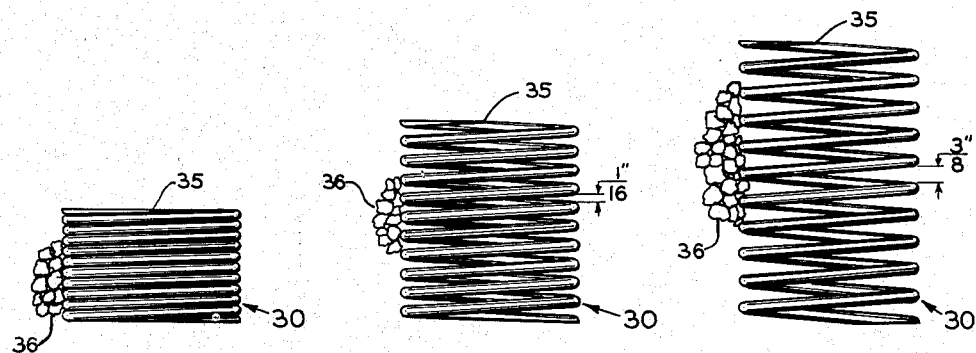
Fig. 2 is a side view of the strainer embodying this invention, showing its closed position.
Fig. 3 is a side view of the same, showing its partially open position.
Fig. 4 is a side view of the same, showing its extreme open position.

The novel strainer 30 consists of a helical wound spring 35 having convolutions of a round or square or the like contour, which spring 35 is specially tensioned, with spaced convolutions, and of a length, so that when the cover is in its lowermost position, all the convolutions provide a conduit spacing of $\frac{1}{16}$ of an inch or less (Fig. 3). The spring 35 is shown in Fig. 2 with contacting convolutions. When the cover reaches its upward limit, the convolutions provide conduit passages not to exceed $\frac{3}{8}$ of an inch (Fig. 4). The accretions are indicated by 36.

The said raw sludge as it enters the digester 10, through the filling pipe 12, enters a quiet zone where the flow velocity drops to practically zero. This loss in velocity allows the heavy solids to settle to the bottom 21 of the digester 10, and the grease to rise to the top to form a scum layer. As said raw sludge enters the tank 10 through pipe 12, the cover 11 ascends, extending the convolutions of the strainer and thus increasing the conduit passages. The finer particles of sludge which tended to plug the passages between the strainer convolutions pass through, cleaning the strainer spaces and increasing the flow. At maximum cover height, the spaces between the convolutions are at their maximum opening. The larger particles of sludge and scum will be impeded by the strainer and allow only a satisfactory supernatant liquor to flow through the strainer 30 to the withdrawal pipe 23, and from the tank 10.

If the rate of withdrawal of supernatant liquor is faster than the raw sludge flow to the tank, the cover will lower, reducing the passages between the convolutions, and reducing the flow.

If it should happen that the passages become clogged, and flow of supernatant liquor is too slow, or stops completely, provision is made for backwashing under pressure by using the pump 18, as described.

The strainer has a substantially cylindrical interior, the lower interior end of which forms an outlet, and has peripherally disposed passages which communicate with said interior, and with the sludge in the digester tank. The strainer is elastically movable in its longitudinal direction, being disposed vertically to pass through the various layers of sludge and supernatant liquor in the tank. The essential feature is the automatic adjustment capacity of the flow passages, from a minimum to a maximum flow into the interior of the strainer, and in its simplest and preferred embodiment, the strainer is formed by a helical, cylindrical spring, the spiral space between the convolutions forming the continuous conduit passage from one end of the spring to the other, which spiral space may be, as described, automatically adjusted.

The strainer may, however, be regulated by a mechanism (Fig. 5), which provides a large movement member 40, which large movement is translated to a small movement, the small movement regulating the helical space of the strainer 30, as shown by long arm lever 40 pivoted at 41 to a vertical stand 42, whereby the short arm lever 43 acts on the upper end of the strainer 30. Either one of both of the ends of the strainer may be moved. A lever 43 connected to lever 40 at pivot 41 may extend to the cover 11, as shown, or to the top 14a of the dome 14.

Figure 5:
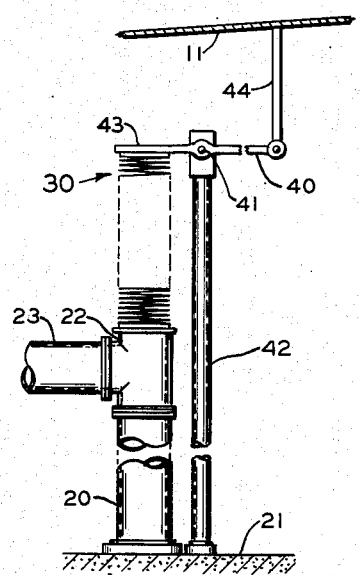
Fig. 5 is a diagrammatic side view showing, one end of the strainer being movable, and provided with a movement transposer, that is, where a relatively large movement of the cover is transposed to a relatively small movement of the spring.
Figure 6:
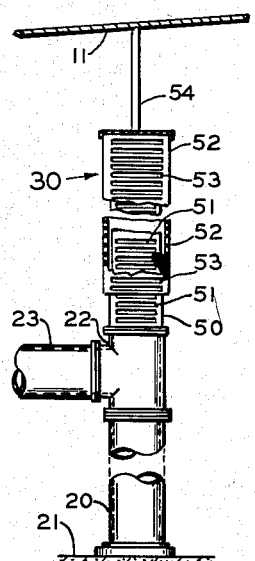
Fig. 6 shows a cross-section of a strainer formed of two rigid concentric sleeves, each having a multiplicity of fixed disc cutouts, the movement of one sleeve to the other varying the conduit passages.

Another embodiment is shown in cross-section in Fig. 6, wherein an inner rigid cylindrical sleeve 50 has cutouts 51, throughout its length and a concentric outer rigid cylindrical sleeve 52 has cutouts 53 throughout its length. A rod 54 extends from the sleeve 52 to either the cover 11, as shown, or to the dome top 14a. The vertical transposition of one sleeve to the other provides either a registration of the cutouts, giving the maximum conduit passage, or a reduction of said spaces to its operative minimum or to zero. The sleeve 50 rests on the T 22 of the pipe 20. Large to small transpositions can be made as shown in Fig. 5. Other modifications to vary the conduit passage suggest themselves.

Figure 7:
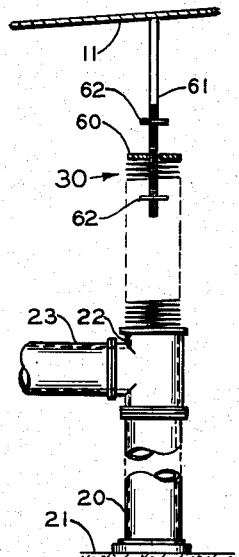
Fig. 7 and Fig. 8 show embodiments in which the upper end of the strainer is fastened to the movable cover, instead of to the top of the dome.

In Fig. 7, the strainer 30 in the form of a spring has one end secured to the T 22 of the pipe 20, and its other end to a plate 60. A screwthreaded rod 61 has internally screwthreaded washers 62, to engage the plate 60, the rod 61 extending to the cover 11.

Figure 8:
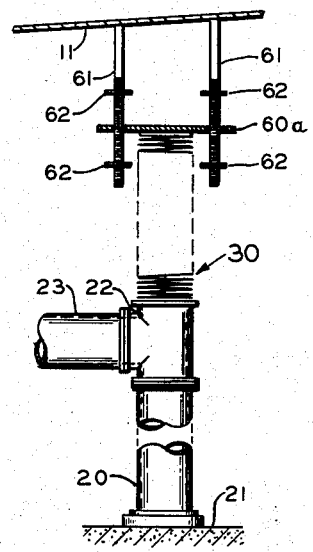

In Fig. 8, the plate 60a extends laterally of the strainer 30, and has a pair of rods 61, with washers 62, the rods being of different lengths to conform to the inclination of the cover 11. The washers 62 are spaced depending on the amount of movement of the cover.

Figure 9:
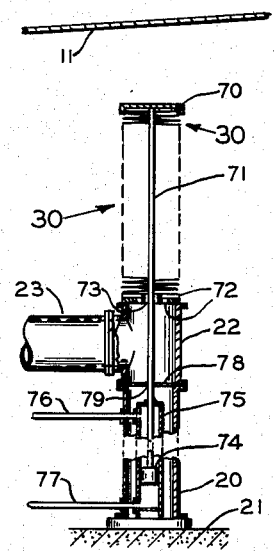
Fig. 9 shows an embodiment in which the strainer is independent of the cover, and controlled by means preferably, outside of the tank.

In Fig. 9, the strainer 30 is shown in an embodiment, which is free of the cover 11. A top plate 70 has a rod 71, which extends downwardly through the strainer 30, and is guided by a perforated plate 72, having a central opening 73, two plates 72 being provided. To the rod 71, a piston 74 is secured, which is guided by a cylinder 75, one end of which is supplied or exhausted by a pipe 76, and the other end of which is supplied or exhausted by a pipe 77. These pipes 76 and 77 extend outside of the tank, and by means, well known, the flow in the pipes 76 and 77 can be controlled. Depending on the position of the piston 75, the strainer is closed partially open or entirely open. The T 22 has a solid bottom plate 78, except for its central guide opening 79, and the plate or plates 72 are perforated to permit the discharge of the strainer 30 into the T 22 and pipe 23. The action of this embodiment is independent of the movement of the cover, and of the inflow and outflow.

The strainer has a variable conduit passage between its minimum extended to its fully extended width, which will satisfactorily strain out a sufficient percentage of sludge with an outflowing supernatant liquor to maintain satisfactory plant operation.

I wish it to be understood that I do not desire to be limited to the exact details of construction shown and described, for obvious modifications will occur to a person skilled in the art.

I claim:

1. In a supernatant liquor strainer for sludge digestion tanks, having a tank for the digestion of sludge with the sludge and supernatant liquor intermingled in undeterminable zones, and having a floating non-fixed cover, a raw sludge inlet, a supernatant liquor outlet, said inlet providing a predetermined inflow corresponding to a predetermined outflow at said outlet normally maintaining a balance of said sludge and supernatant liquor in said tank, and a separate digested sludge outlet, the combination of, a vertically disposed strainer within said supernatant liquor, having at one end its interior in communication with said supernatant liquor outlet, and having openings, and having its other end connected with said cover, the cover being in a position corresponding to said balance of raw sludge and supernatant liquor in the tank, and means for regulating said openings to enable the flow of excess supernatant liquor through said strainer and into its interior and out of the supernatant liquor outlet when the contents in the tank has been increased to move said cover to the amount said inflow exceeds said outflow, whereby said balance is automatically maintained in the tank under wide variable inputs.

2. In a supernatant liquor strainer for sludge digestion tanks, having a tank for the digestion of sludge with the sludge and supernatant liquor intermingled in undeterminable zones, a raw sludge inlet, a supernatant liquor outlet, said inlet providing a predetermined inflow corresponding to a predetermined outflow at said outlet normally maintaining a balance of said sludge and supernatant liquor in said tank, and a separate digested sludge outlet, the combination of, a vertically disposed strainer within the supernatant liquor, having at one end its interior in communication with said supernatant liquor outlet, and having longitudinally disposed openings, and means at the other end of said strainer for regulating said openings to enable the flow of excess supernatant liquor through said openings and into its interior and out of said supernatant liquor outlet, when the contents in the tank has been increased by said inflow exceeding said outflow, whereby said balance is automatically maintained in the tank under wide variable inputs.

RALPH B. CARTER, Jr.

REFERENCES CITED

The following references are of record in the file of this patent:

UNITED STATES PATENTS

| Number | Name | Date |
|---|---|---|
| 408,487 | Jewell | Aug. 6, 1889 |
| 2,383,672 | Neisingh | Aug. 28, 1945 |
| 2,409,585 | Piatt | Oct. 15, 1946 |
| 2,429,417 | Magill | Oct. 21, 1947 |
| 2,475,561 | Cooperider et al. | July 5, 1949 |